United States Patent [19]
Leckie

[11] 3,951,928
[45] Apr. 20, 1976

[54] PETROLEUM RESINS
[75] Inventor: Malcolm Alastair Leckie, Melbourne, Australia
[73] Assignee: Imperial Chemical Industries Limited, London, England
[22] Filed: Aug. 12, 1974
[21] Appl. No.: 496,877

Related U.S. Application Data
[63] Continuation-in-part of Ser. No. 311,524, Dec. 4, 1972, abandoned.

[52] U.S. Cl. .................... 526/66; 260/33.6 PQ; 526/77; 526/291; 526/284
[51] Int. Cl.² .............. C08F 210/00; C08F 212/00; C08F 240/00
[58] Field of Search .................. 260/80.78, 82 M

[56] References Cited
UNITED STATES PATENTS

| | | | |
|---|---|---|---|
| 2,894,937 | 7/1959 | Banes et al. | 260/82 |
| 3,628,918 | 12/1971 | Beals | 23/284 |
| 3,709,854 | 1/1973 | Hepworth et al. | 260/82 |
| 3,763,125 | 10/1973 | Moody et al. | 260/81 |

FOREIGN PATENTS OR APPLICATIONS

| | | |
|---|---|---|
| 2,261,191 | 6/1973 | Germany |
| 2,163,629 | 7/1973 | France |
| 2,163,628 | 7/1973 | France |

Primary Examiner—Joseph L. Schofer
Assistant Examiner—A. L. Clingman
Attorney, Agent, or Firm—Cushman, Darby & Cushman

[57] ABSTRACT

In the production of a petroleum resin an unsaturated hydrocarbon feedstock is continuously polymerised by means of a Friedel-Crafts catalyst in a plurality of alternating polymerisation and cooling zones in which catalyst is added to each polymerisation zone.

11 Claims, 1 Drawing Figure

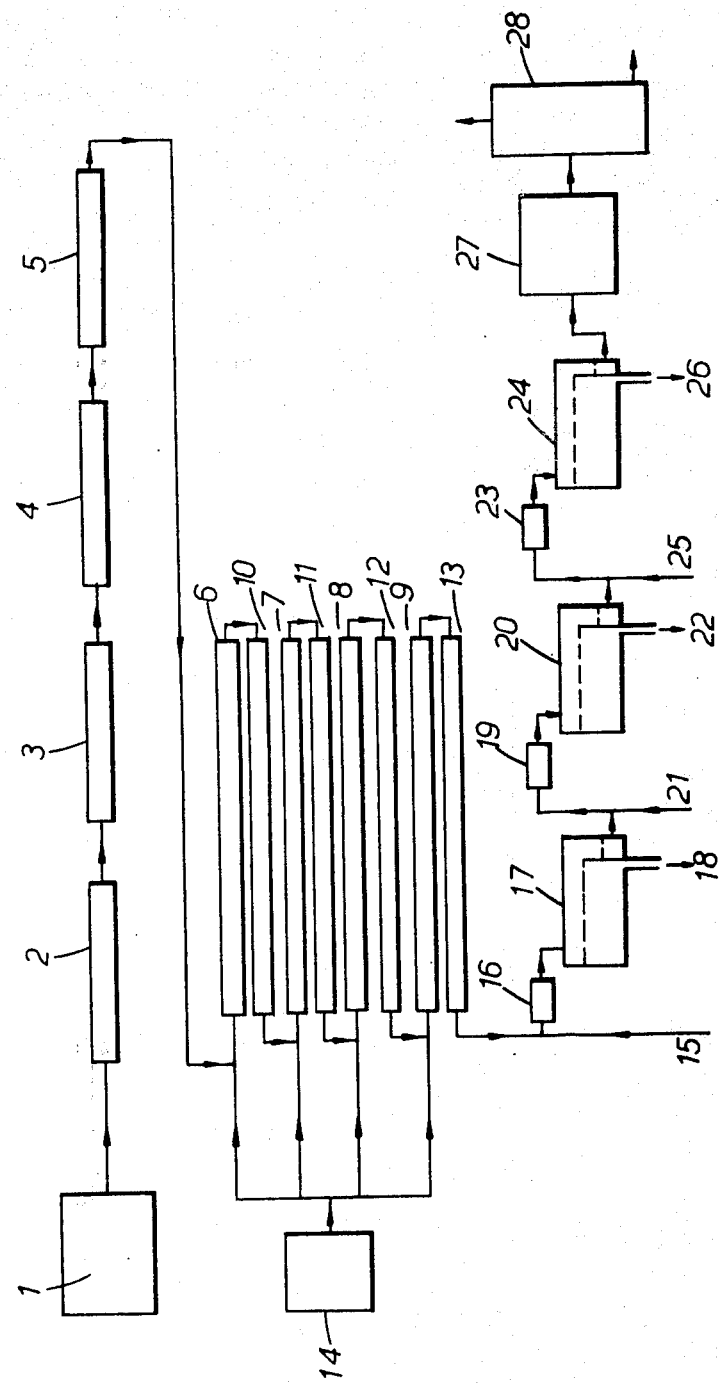

PETROLEUM RESINS

This application is a continuation-in-part of Ser. No. 311,524, filed Dec. 4, 1972, now abandoned.

This invention relates to the production of petroleum resins.

Petroleum resins are produced by polymerising an unsaturated hydrocarbon feedstock of petroleum origin containing, for example, 5 to 10 carbon atoms usually with the help of a Friedel Crafts catalyst such as aluminum chloride, in a continuous or batchwise process. The unsaturated hydrocarbon feedstock generally contains a number of constituents which may contain olefine or aromatic substitution. The properties of the petroleum resins which are obtained depend on both the carbon number and nature of the unsaturation of the hydrocarbon feedstock. A particularly useful feedstock contains 4 to 6 carbon atoms and is primarily olefinically unsaturated. Thus a suitable feedstock is obtained by cracking by heating, usually in the presence of steam, a petroleum derivative such as gas oil or naphtha. Fractionation of the cracked product yields inter alia ethylene, propylene butenes and butadiene and what, for the sake of convenience, is termed a $C_5$ stream although as well as 5 carbon atom hydrocarbons this stream also contains some hydrocarbons containing four and six carbon atoms respectively. The $C_5$ stream typically boils in the range 10° to 80°C and may comprise the following constituents: isoprene, cis- and trans-piperylene, n-pentane, isopentane, pentene-1, cyclopentadiene, dicyclopentadiene, trans-pentene-2, 2-methylbutene-2, cyclopentene, cyclopentane and benzene. The $C_5$ stream is suitable for petroleum resin production with or without further treatment, interpolymerisation of the olefinic constituents producing a resin typically pale yellow in colour melting in the temperature range 80° – 140°C. The present invention concerns an improved method of continuously carrying out the polymerisation of an unsaturated hydrocarbon feedstock of petroleum origin to give a petroleum resin.

According to the invention a process for the production of petroleum resins comprises the continuous polymerisation of an unsaturated hydrocarbon feedstock in the presence of a Friedel Crafts catalyst in which the hydrocarbon feedstock passes through a plurality of alternating polymerisation and cooling zones and in which catalysts is added to each polymerisation zone.

The hydrocarbon feedstock may contain 5 to 10 carbon atoms and is suitably a $C_5$ stream as described above which is preferably submitted to a pretreatment as disclosed in our co-pending U.S. Pat. application Ser. No. 177,113 (now U.S. Pat. No. 3,709,854.

This pretreatment comprises heating the $C_5$ stream to a temperature of at least 160°C, preferably to a temperature in the range 160°C to 200°C for a period of up to 5 hours, preferably 0.05 to 1.5 hrs. The pretreatment is generally carried out under the autogenous pressure of the $C_5$ stream or under a positive pressure e.g. up to 700 p.s.i.g. Instead of, or in addition to and before this pretreatment at 160°C. the feedstock may be heated at a temperature of 100° to 160°C. preferably about 120° for up to 5 hours, preferably 0.05 to 1.5 hours so as to cause at least part of the cyclopentadiene in the $C_5$ stream to dimerise to dicyclopentadiene. It is preferred to carry out the heat soaking pretreatment stages continuously and this may conveniently be effected in tubular reactors in which the feedstock passes through a tube maintained at the desired temperature, the time of passage through the tube being the time required for the heat-soak to take place. If the pretreatment at 160°C is carried out continuously, particularly, if it is carried out in a tubular reactor it is advantageous not to cool the pretreated $C_5$ stream down to the polymerisation temperature immediately but to first cool it to a temperature of 100° to 160°C and to hold it at this temperature for a period of up to 5 hours, preferably 0.05 to 1.5 hours so as to maintain as high as possible ratio of dicyclopentadiene to monocyclopentadiene in the polymerisation feed. This third heating stage may also be carried out continuously preferably in a tubular reactor and like the two other heating stages is suitably carried out under the autogenous pressure of the $C_5$ stream or under a positive pressure, e.g. up to 700 p.s.i.g.

The Friedel Crafts catalysts which are used in the process of the present invention are suitably inorganic halides or inorganic strong acids. Inorganic halides are generally preferred and include halides of aluminium, iron, tin, boron, zinc, antimony and titanium. The inorganic halide is advantageously used in conjunction with a hydrogen halide such as hydrogen chloride or hydrogen bromide. For example aluminium chloride, a preferred catalyst, may be used as a complex with hydrogen chloride in an aromatic solvent such as toluene or a xylene, or more preferably in a benzene which is liquid at the temperature of the polymerisation and which is substituted by at least one secondary or tertiary alkyl group or by a cycloalkyl group, e.g. p-cymene or, in particular, cumene (see our co-pending British Patent Application No. 5097/71; equivalent Belgian Patent No. 779,454).

The polymerisation is carried out in a plurality of alternating polymerisation and cooling zones and catalyst is added to each polymerisation zone. The polymerisation is suitably carried out at a temperature in the range −100° to +200°C, preferably 0° to +200°C, more preferably 50° to 100°C under autogenous pressure or a positive pressure up to 700 p.s.i.g., so for most purposes the cooling zone may be water cooled. As the polymerisation is exothermic the temperature rises adiabatically in each polymerisation zone to a maximum of 200°C only to drop in the next cooling zone to a minimum of −100°C preparatory to further polymerisation in the subsequent polymerisation zone. The polymerisation and cooling zones may comprise any vessels in which the desired processes can take place but tubular reactors are particularly suitable. In this case the unsaturated hydrocarbon feedstock together with catalyst passes through a tube in which its residence time is predetermined so that the catalyst activity is substantially exhausted and through which the temperature rises due to the heat of polymerisation. The next tube is cooled and the residence time of the hydrocarbon is such that the required drop in temperature takes place, i.e. to such a temperature that the exothermic heat of the polymerisation reaction in the subsequent polymerisation zone does not cause the feedstock temperature to rise to more than 200°C. The following tubular reactor is a polymerisation zone and additional catalyst is introduced to the hydrocarbon feed. There may suitably be 2 to 8 pairs of such polymerisation and cooling zones, particularly 3 to 5 pairs. The amount of catalyst added is shared between the various polymerisation zones but overall 0.05 to 5%, preferably 0.5 to 1.5% of catalyst such as aluminium chloride is added based on the weight of unsaturated hydrocarbon to be polymerised. Preferably the catalyst is added so as to achieve the same rate of conversion of the feedstock in each polymerisation zone before the catalyst activity is substantially exhausted. The degrees of conversion may be compared by the temperature rises in each zone which are desirably but not necessarily approximately the same.

The polymerisation product leaving the final cooler contains the catalyst complex and this is removed by treatment with aqueous alkali such as sodium hydroxide or ammonia or with aqueous alcohol, e.g. a $C_1$ to $C_4$ alcohol such as isopropanol. This treatment may also be carried out continuously, e.g. in a series of mixers and settlers. The polymer is finally water washed and stipped of residual unpolymerised hydrocarbons e.g. by distillation, preferably by steam distillation.

The invention will now be further described with reference to the attached block diagram of the process.

A $C_5$ stream comprising isoprene, cis- and trans-piperylene, n-pentane, isopentane, pentene-1, cyclopentadiene, dicyclopentadiene, trans-pentene-2, 2-methylbutene-2, cyclopentene, cyclopentane and benzene is stored in storage tank 1 from which it is fed continuously to three tubular reactors 2, 3 and 4 in series. In the first reactor the temperature of the $C_5$ stream is allowed to rise adiabatically from 120° to 180°C as the exothermic dimerisation of the dicyclopentadiene takes place and is then held at this temperature in the second reactor. After leaving the second reactor the temperature of the stream is decreased to 135°C and is then held at this temperature in the third reactor. The residence time of the $C_5$ stream in each reactor is 5, 20 and 40 minutes respectively. After passing through the third reactor the hydrocarbon stream is cooled to 60°C in water cooler 5 and is then fed continuously to a series of tubular polymerisation reactors 6, 7, 8 and 9 interposed with water coolers 10, 11, 12 and 13 respectively. Catalyst is fed from a storage tank 14 to each polymerisation reactor. The catalyst is a liquid complex of aluminium chloride, hydrogen chloride and cumene and is fed to the four polymerisation reactors in such amounts as to give the same temperature rise in each reactor. The temperature of the hydrocarbon rises in each reactor to 90° to 100°C and is then reduced to 60°C in each subsequent cooler. Residence time in each reactor is approximately 3 minutes. After leaving the last cooler 13 the polymerised product is mixed with 10% of its weight of a 1:1 mixture of water and isopropanol from line 15 in mixer 16 and then allowed to settle in settler 17. The isopropanol/water/aluminium chloride is removed from the settler by line 18 for recovery of the isopropanol while the polymer solution is pumped to a mixer 19 and settler 20 for a repeat of the isopropanol/water washing process, the isopropanol/water being fed in through line 21 and the spent wash liquor being removed via line 22. A third wash with water alone takes place in mixer 23 and settler 24, the water being fed in through line 25 and removed from the mixer via line 26. The washed polymer solution is held in a storage tank 27 from which it is fed to a final stream distillation unit 28 from the base of which is recovered molten resin which is solidified in, for example, pastillated form while the distillate comprising water and unreacted hydrocarbons is sent for recovery.

EXAMPLE 1

The following experiment was designed to simulate in one reaction vessel the alternating pairs of polymerisation and cooling zones which are a feature of the present invention.

2.5 Kilograms of a $C_5$ stream which had been heat soaked for 1 hour at 170°C was placed in a 5-liter autoclave fitted with a water cooling coil. The heat soaked stream contained 12% by weight dicyclopentadiene, 11.5% isoprene, 8% piperylene and 3.5% heteroadducts of cyclopentadiene, piperylene and isoprene, the balance being mainly $C_5$ olefines and paraffins. The temperature of the contents of the autoclave was raised to 60°C and 28 mls. of a catalyst was added. The catalyst consisted of an aluminum chloride/hydrogen chloride/cumene complex and contained 8 grams aluminium chloride, After addition of the catalyst the temperature was allowed to rise until it reached 85°C (2 minutes) when cooling water was applied and the temperature decreased to 60°C. 10 ml. of catalyst was then added when the temperature rose again to 170°C. The reaction mixture was again cooled to 60° C and again 10 mls. of catalyst added. Following further cooling to 60°C the final 20 mls. of catalyst were introduced and after 2 minutes reaction the mixture was cooled down to ambient temperature. In total 68 mls. of catalyst complex were added which contained a total of 19.8 grams of aluminum chloride.

The resin solution resulting from the polymerisation was stirred gently with a 1:1 mixture by volume of isopropanol and water (300 mls.) and allowed to settle. The resin layer was separated and the process repeated. Finally the resin solution was washed with two separate amounts of water (300 mls. each). The resin isolated by distillation, firstly at atmospheric pressure with a sidearm take-off and boiler temperature up to 180°C to remove unpolymerised constituents of the $C_5$ stream and lastly at 50 mm. pressure and boiler temperature 200°C.

834 grams of resin were obtained of Gardner colour 8 (50% solution in toluene), softening point (ball and ring) 98.5°C and melt viscosity 3.5 poise at 200°C and 88 poise at 130°C.

EXAMPLES 2 TO 5

The conditions applied in Example 1 were repeated in Examples 2 to 5 but using different feedstocks and replacing the single stage heat soak pretreatment of the feed at 170°C. by a two-stage heat soak pretreatment as indicated below. The results of these Examples were as follows:

| EXAMPLE | 2 | 3 | 4 | 5 |
| --- | --- | --- | --- | --- |
| Feed Composition after heat-soak % by weight | | | | |
| isobutene/butene-1 | 0 | 7.5 | 2.4 | 2.5 |
| butadiene | 0 | 0 | 2.6 | 2.7 |
| trans-butene-2 | 0 | 1.2 | 1.2 | 1.1 |
| cis-butene-2 | 0 | 1.2 | 1.6 | 1.3 |

-continued

| EXAMPLE | | 2 | 3 | 4 | 5 |
|---|---|---|---|---|---|
| 3-methylbutene-1 | | 0.4 | 0.9 | 0.7 | 2.7 |
| pentene-1 | | 2.8 | 3.1 | 2.6 | 2.4 |
| 2-methylbutene-1 | | 5.1 | 5.4 | 4.7 | 4.3 |
| pentene-2 | | 1.7 | 1.6 | 1.7 | 1.6 |
| isoprene | | 12.9 | 14.1 | 12.0 | 12.4 |
| 2-methylbutene-2 | | 2.8 | 2.9 | 2.7 | 2.6 |
| trans-piperylene | | 5.6 | 4.3 | 5.5 | 5.4 |
| cis-piperylene | | 3.3 | 2.3 | 3.4 | 3.3 |
| cyclopentene | | 3.1 | 2.3 | 3.1 | 2.9 |
| dicyclopentadiene | | 13.3 | 12.2 | 11.3 | 11.5 |
| heteroadducts* | | 5.7 | 2.8 | 9.7 | 8.5 |
| Heat soak 1st stage, | temp °C | 180 | 180 | 180 | 180 |
| | time (minutes) | 25 | 10 | 30 | 20 |
| Heat soak 2nd stage, | temp °C | 150 | 150 | 150 | 150 |
| | time (minutes) | 40 | 40 | 40 | 40 |
| Yield % | | 38 | 38 | 29 | 34 |
| Resin softening point °C | | 108 | 94.5 | 100.5 | 98 |
| Colour (Gardner) | | 11 | 10 | 7 to 8 | 9 |
| Melt viscosity at 200°C (Poise) | | 4.1 | 1.4 | 3.9 | 2.2 |
| Melt viscosity at 130° C (Poise) | | 78.4 | 39.1 | 76.7 | 66 |

*hereroadducts are mixed dimers of piperylene, isoprene and dicyclopentadiene.

I claim:

1. In a process for the production of petroleum resins which comprises continuously and exothermically polymerising an unsaturated hydrocarbon feedstock containing 4 to 10 carbon atoms at a temperature in the range of −100°C to +200°C and in the presence of a Friedel Crafts catalyst, the improvement whereby the hydrocarbon feedstock is passed through a plurality of alternating polymerisation and cooling zones and in which catalyst is added to each polymerisation zone, the temperature of the feedstock rising because of said exothermic polymerisation in each polymerisation zone and being reduced in each cooling zone.

2. The process of claim 1 in which the feedstock is first heated to a temperature in the range 100° to 160°C for a period up to 5 hours to dimerise monocyclopentadiene.

3. The process of claim 1 in which the Friedel Crafts catalyst comprises an inorganic halide.

4. The process of claim 3 in which a hydrogen halide is present.

5. The process of claim 4 in which the catalyst comprises aluminium chloride and hydrogen chloride in an aromatic solvent.

6. The process of claim 1 in which there are 2 to 8 pairs of alternating polymerisation and cooling zones.

7. The process of claim 1 in which a total of 0.5 to 5% by weight of catalyst is added based on the weight of unsaturated hydrocarbon to be polymerised, the catalyst being shared between the polymerisation zones so as to achieve the same rate of conversion of feedstock in each polymerisation zone.

8. The process of claim 1 in which the catalyst is removed from the polymer after leaving the last cooling zone by treatment with aqueous alkali or ammonia or with aqueous alcohol.

9. The process of claim 1 in which an unsaturated hydrocarbon feedstock containing 5 to 10 carbon atoms is heated to a temperature in the range 100 to 160°C for a period up to 5 hours to dimerise monocyclopentadiene and is then polymerised by contact with a catalyst comprising aluminium chloride and hydrogen chloride in an aromatic solvent selected from the group consisting of toluene, xylene and a benzene which is liquid at the temperature of the polymerisation and which is substituted by at least one secondary or tertiary alkyl group or by a cycloalkyl group, the polymerisation being carried out in 2 to 8 pairs of alternating polymerisation and cooling zones at a temperature in the range 0° to 200°C, a total of 0.5 to 5% by weight of catalyst being shared between the polymerisation zones so as to achieve the same rate of conversion of the feedstock in each polymerisation zone.

10. The process of claim 9 in which the polymerisation and cooling zones comprise tubular reactors.

11. In a process for the production of petroleum resins as claimed in claim 1 which comprises continuously and exothermically polymerising an unsaturated hydrocarbon feedstock containing 4 to 10 carbon atoms at a temperature in the range of −100°C to +200°C in the presence of a Friedel Crafts catalyst, the improvement whereby the hydrocarbon feedstock is passed through a plurality of alternating polymerisation and cooling zones and in which catalyst is added to each polymerisation zone and in which:

a. the feedstock temperature in each polymerisation zone rises to at most 200°C and its residence time in each polymerisation zone is such that the catalyst activity in that zone is substantially exhausted, and b. the feedstock is cool in each subsequent cooling zone for such a time that its temperature falls to not less than −100°C and to such a temperature that the exothermic heat of the polymerisation reaction in the subsequent polymerisation zone does not cause the temperature of the feedstock to rise to more than 200°C.

* * * * *